United States Patent
Ju et al.

(10) Patent No.: US 9,258,483 B2
(45) Date of Patent: *Feb. 9, 2016

(54) MULTI-PURPOSE CAMERA SYSTEM SUPPORTING NORMAL CAMERA FUNCTIONALITY AND ADDITIONAL USER INPUT FUNCTIONALITY

(75) Inventors: Chi-Cheng Ju, Hsinchu (TW); Cheng-Tsai Ho, Taichung (TW); Ding-Yun Chen, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 579 days.

This patent is subject to a terminal disclaimer.

(21) Appl. No.: 13/485,936

(22) Filed: Jun. 1, 2012

(65) Prior Publication Data

US 2013/0324190 A1 Dec. 5, 2013

(51) Int. Cl.
  *H04M 1/00* (2006.01)
  *H04N 5/228* (2006.01)
  *H04N 5/232* (2006.01)
  *G06F 3/03* (2006.01)
  *G06F 3/0354* (2013.01)

(52) U.S. Cl.
  CPC .......... *H04N 5/23245* (2013.01); *G06F 3/0317* (2013.01); *G06F 3/03547* (2013.01)

(58) Field of Classification Search
  CPC .. H04W 88/02; H04N 5/23245; H04N 5/228; H04N 9/73; H04N 5/23248; H04N 5/225; G06F 3/03547; G06F 3/0317; G06F 3/041; G06F 3/033
  USPC ............... 455/556.1, 66.1, 67.11, 557, 556.2, 455/566; 348/222.1, 223.1, 208.4, E05.031, 348/E09.051, 208.1
  See application file for complete search history.

(56) References Cited

U.S. PATENT DOCUMENTS

| | | | | |
|---|---|---|---|---|
| 7,148,919 B2* | 12/2006 | Voss et al. | ................. | 348/220.1 |
| 7,834,908 B2* | 11/2010 | Hatanaka | ................. | 348/208.4 |
| 8,248,484 B2* | 8/2012 | Sugimoto | ................. | 348/222.1 |
| 8,694,053 B2* | 4/2014 | Kim et al. | ................. | 455/556.2 |
| 2004/0100574 A1* | 5/2004 | Voss et al. | ..................... | 348/362 |
| 2006/0114337 A1 | 6/2006 | Rothschild | | |
| 2006/0215043 A1* | 9/2006 | Furukawa | ................. | 348/222.1 |
| 2007/0230938 A1* | 10/2007 | Hatanaka | ...................... | 396/153 |
| 2009/0181719 A1* | 7/2009 | Cho | ........................... | 455/556.1 |
| 2011/0176014 A1* | 7/2011 | Hong et al. | ................. | 348/208.4 |
| 2013/0343611 A1* | 12/2013 | Subramanian et al. | ...... | 382/103 |

FOREIGN PATENT DOCUMENTS

| | | |
|---|---|---|
| CN | 101505329 A | 8/2009 |
| CN | 101645943 A | 2/2010 |
| CN | 201976178 U | 9/2011 |

* cited by examiner

*Primary Examiner* — Pablo Tran
(74) *Attorney, Agent, or Firm* — Winston Hsu; Scott Margo (57) ABSTRACT

A multi-purpose camera system includes an image capture block and an image signal processing block. The image capture block is arranged for generating an image signal, wherein the image capture block has an image sensor, an optical system, and a control circuit. The image signal processing block is arranged for processing the image signal. When the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; and an overall configuration of the control circuit and the image signal processing block in the first operation mode is different from an overall configuration of the control circuit and the image signal processing block in the second operation mode.

25 Claims, 5 Drawing Sheets

MULTI-PURPOSE CAMERA SYSTEM SUPPORTING NORMAL CAMERA FUNCTIONALITY AND ADDITIONAL USER INPUT FUNCTIONALITY

BACKGROUND

The disclosed embodiments of the present invention relate to a camera system, and more particularly, to a multi-purpose camera system which supports normal camera functionality and additional user input functionality.

A traditional feature phone is equipped with standard directional buttons or a directional pad. In general, the standard directional button/directional pad is made by a mechanical structure. Hence, to enter the user input, the user has to press the directional button/directional pad with larger force. In addition, as the standard directional button/directional pad is implemented using the mechanical structure, it may have degraded sensitivity after being used for a long time.

Thus, there is a need for an improved user interface which can take place of the standard directional button/directional pad for cost reduction and allow the user to easily and accurately enter the user input.

SUMMARY

In accordance with exemplary embodiments of the present invention, a multi-purpose camera system which supports normal camera functionality and additional user input functionality is proposed to solve the above-mentioned problem.

According to a first aspect of the present invention, an exemplary multi-purpose camera system is disclosed. The exemplary multi-purpose camera system includes an image capture block and an image signal processing block. The image capture block is arranged for generating an image signal, wherein the image capture block has an image sensor, an optical system, and a control circuit. The image signal processing block is arranged for processing the image signal. When the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; and an overall configuration of the control circuit and the image signal processing block in the first operation mode is different from an overall configuration of the control circuit and the image signal processing block in the second operation mode.

According to a second aspect of the present invention, an exemplary electronic device is disclosed. The exemplary electronic device includes a multi-purpose camera system and a user input processing system. The multi-purpose camera system includes an image capture block and an image signal processing block. The image capture block is arranged for generating an image signal, wherein the image capture block comprises an image sensor, an optical system, and a control circuit. The image signal processing block is arranged for processing the image signal, wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; and an overall configuration of the control circuit and the image signal processing block in the first operation mode is different from an overall configuration of the control circuit and the image signal processing block in the second operation mode. The user input processing system is for acting as another part of the user input apparatus, and is arranged for identifying the user input by processing an image output of the image signal processing block in the second operation mode.

According to a third aspect of the present invention, an exemplary multi-purpose camera system integrated in a portable electronic device is disclosed. The exemplary multi-purpose camera system includes an image capture block and an image signal processing block. The image capture block is arranged for generating an image signal. The image signal processing block is arranged for processing the image signal. When the multi-purpose camera system is operated in a first operation mode, the multi-purpose camera system acts as a camera for generating a captured image output; and when the multi-purpose camera system is operated in a second operation mode, the multi-purpose camera system acts as part of a user input apparatus for receiving a user input.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connected" is intended to mean either an indirect or direct electrical connection. Accordingly, if one device is electrically connected to another device, that connection may be through a direct electrical connection, or through an indirect electrical connection via other devices and connections.

The main concept of the present invention is to use a camera system as part of a user input apparatus. In other words, the present invention is directed to a multi-purpose camera system which supports multiple operation modes. For example, when the multi-purpose camera system is operated in a first operation mode, the multi-purpose camera system acts as a normal camera, and when the multi-purpose camera system is operated in a second operation mode, the multi-purpose camera system acts as part of the user input apparatus. Further details are described as below.

Figure 1:
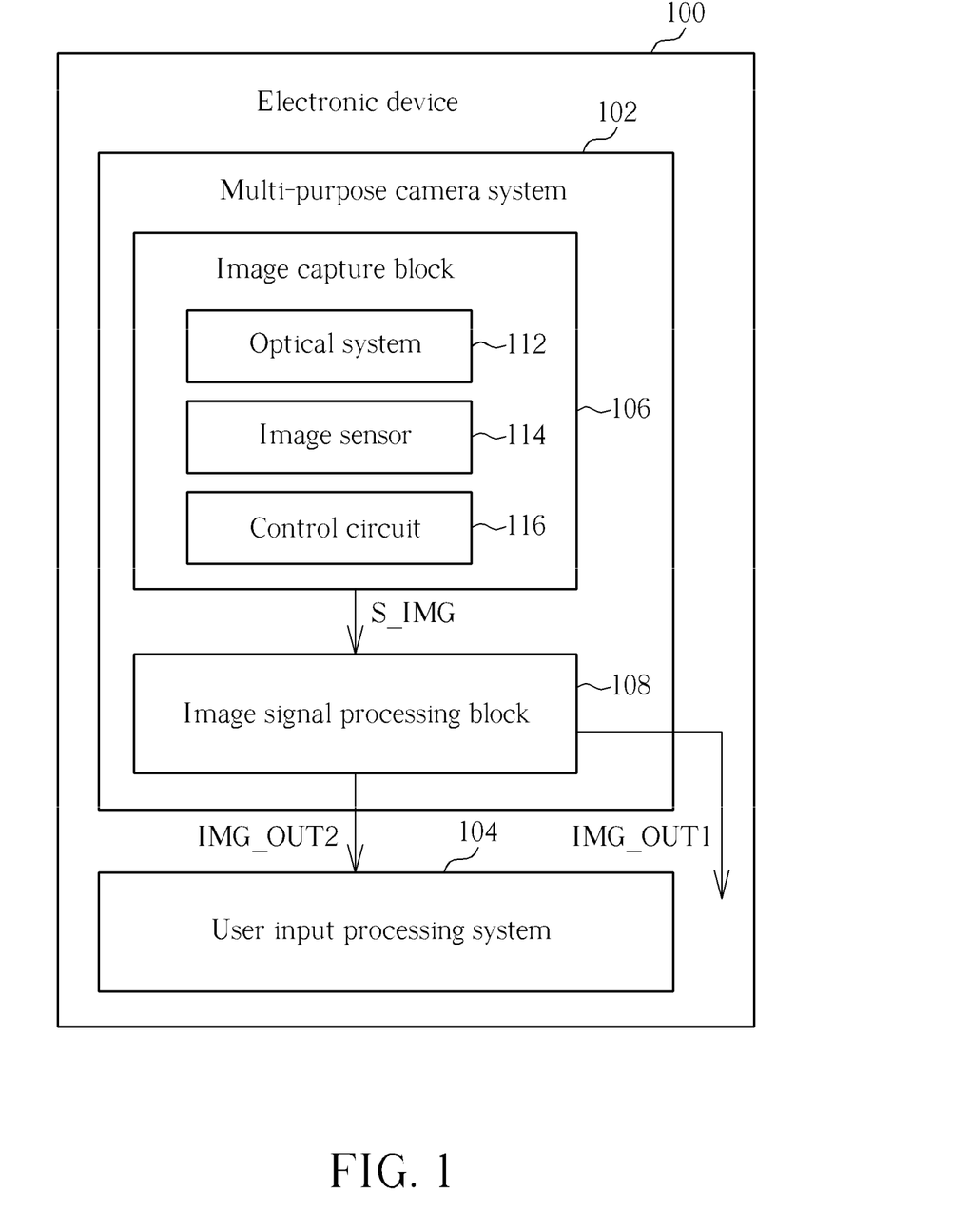
FIG. 1 is a block diagram illustrating an electronic device according to an exemplary embodiment of the present invention.

FIG. 1 is a block diagram illustrating an electronic device according to an exemplary embodiment of the present invention. The electronic device 100 may a portable electronic device, such as a mobile phone with the proposed multi-purpose camera system integrated therein. As shown in FIG. 1, the electronic device 100 includes, but is not limited to, a multi-purpose camera system 102 and a user input processing system 104. The multi-purpose camera system 102 has an image capture block 106 and an image signal processing block 108, where the image capture block 106 has an optical system 112, an image sensor 114, and a control circuit 116. The image capture block 106 is arranged for generating an image signal S_IMG, and the image signal processing block 108 is arranged for processing the image signal S_IMG to generate an image output IMG_OUT1/IMG_OUT2. When the multi-purpose camera system 102 is operated in a first operation mode (e.g., a normal camera mode), the multi-purpose camera system 102 acts as a camera for generating a captured image output IMG_OUT1. However, when the multi-purpose camera system 102 is operated in a second operation mode (e.g., a special camera mode such as an optical mouse mode), the multi-purpose camera system 102 acts as part of a user input apparatus for receiving a user input and correspondingly generating an image output IMG_OUT2. Besides, the user input processing system 104 acts as another part of the user input apparatus, and is arranged for identifying the user input by processing the image output IMG_OUT2 of the image signal processing block 108 in the second operation mode. It should be noted that an overall configuration of the control circuit 116 and the image signal processing block 108 in the first operation mode is different from an overall configuration of the control circuit 116 and the image signal processing block 108 in the second operation mode.

Figure 2:
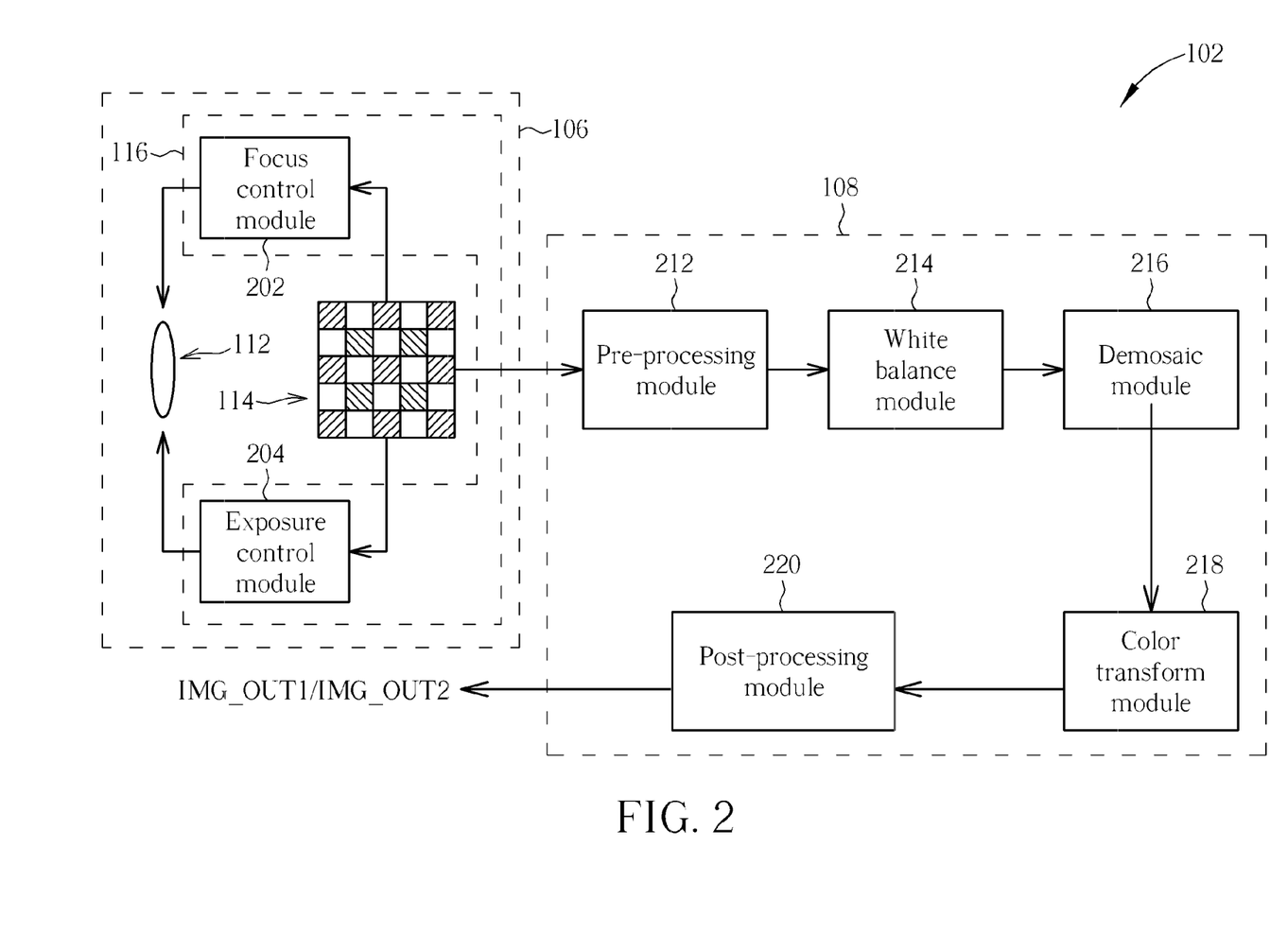
FIG. 2 is a diagram illustrating an exemplary implementation of the multi-purpose camera system shown in FIG. 1.

Please refer to FIG. 2, which is a diagram illustrating an exemplary implementation of the multi-purpose camera system 102 shown in FIG. 1. As shown in FIG. 2, the control circuit 116 in the image capture block 106 may include a focus control module 202 and an exposure control module 204. The optical system 112 may include a lens module whose focus setting and exposure setting (e.g., aperture size and/or shutter speed) are controlled by the focus control module 202 and the exposure control module 204, respectively. Regarding the image signal processing block 108, it includes a plurality of signal processing modules, such as a pre-processing module 212, a white balance module 214, a demosaic module 216, a color transform module 218, and a post-processing module 220. The pre-processing module 212 may perform dark current compensation, linearization, flare compensation, etc. The white balance module 214 may perform automatic/manual compensation for white balance by applying different weighting factors to the red (R), green (G) and blue (B) components of an image. The demosaic module 216 may make use of pixel neighborhood information to estimate values of pixel colors that are not measured/sensed by the image sensor 114. The color transform module 218 may perform a color transform from one color space to another color space. For example, the color transform module 218 may perform an RGB-to-YUV color transform upon a color image to thereby derive a black & white image. The post-processing module 220 may perform color-artifact removal, edge enhancement, coring, etc.

By way of example, but not limitation, changing the overall configuration of the control circuit 116 and the image signal processing block 108 may be realized by disabling at least one signal processing module/control module and/or controlling at least one signal processing module/control module to employ a different algorithm (e.g., a simplified algorithm or a low-power algorithm). For clarity, assuming that the multi-purpose camera system 102 acts as part of an optical mouse when configured to operate in the second operation mode (e.g., special camera mode), several examples with reference to the exemplary multi-purpose camera system 102 shown in FIG. 2 are disclosed hereinafter.

In a first exemplary design, at least one signal processing module included in the image signal processing block 108 is enabled (or powered on) in the first operation mode, and is disabled (or powered off) in the second operation mode. As the multi-purpose camera system 102 operated in the second operation mode to perform an optical mouse function does not need to produce a precise image of a captured scene, one or more of the signal processing modules included in the image signal processing block 108 may be shut down without affecting the desired optical mouse function. For example, the pre-processing module 212, the white balance module 214 and/or the post-processing module 220 may be disabled when the multi-purpose camera system 102 is operated in the second operation mode, such that the input of the disabled signal processing module is bypassed without being processed by the disabled signal processing module. Additionally, due to shutting down one or more signal processing modules in the second operation mode, power consumption of the image signal processing block 108 in the second operation mode is lower than power consumption of the image signal processing block 108 in the first operation mode. In a case where the electronic device 100 is a portable electronic device powered by a battery device, the electronic device 100 may benefit from such a low power consumption feature of the multi-purpose camera system 102 when the multi-purpose camera system 102 is configured to act as part of an optical mouse which is required to continuously capture successive images for detecting movement/action of an object such as user's finger.

In a second exemplary design, at least one signal processing module included in the image signal processing block 108 employs a first algorithm in the first operation mode, and employs a second algorithm different from the first algorithm in the second operation mode. As the multi-purpose camera system 102 operated in the second operation mode to perform an optical mouse function does not need to produce a precise image of a captured scene, one or more of the signal processing modules included in the image signal processing block 108 may employ the second algorithm (e.g., a simplified algorithm or a low-power algorithm) without affecting the desired optical mouse function. Hence, images which can be used to successfully detect the movement/action of the object (e.g., user's finger) may be obtained by configuring the demosaic module 216 to use a simplest algorithm among all available demosaicing algorithms, and/or configuring the color transform module 218 to perform an RGB-to-YUV color transform upon a color image to generate a black & white image and only store luminance (Y) values derived from the RGB-to-YUV color transform.

After a luminance image (i.e., black & white image) is obtained by the color transform module 218, the following post-processing module 220 may derive a binary image from the black & white image by comparing a luminance value of each pixel in the black & white image with a threshold value, assigning a first predetermined luminance value (e.g., 255) to the pixel when the luminance value is greater than the threshold value, and assigning a second predetermined luminance value (e.g., 0) to the pixel when the luminance value is not greater than the threshold value. Thus, as the computational complexity is reduced due to image binarization, the optical mouse function can be easily realized through analyzing successive binary images by using the simplified algorithm/low-power algorithm.

Alternatively, after a luminance image (i.e., black & white image) is obtained by the color transform module 218, the following post-processing module 220 may down-sample the black & white image with an original image resolution (e.g., 720×480) to generate a down-sampled black & white image with a reduced image resolution (e.g., 45×30), and then derive a binary image from the down-sampled black & white image by comparing a luminance value of each pixel in the down-sampled black & white image with a threshold value, assigning a first predetermined luminance value (e.g., 255) to the pixel when the luminance value is greater than the threshold value, and assigning a second predetermined luminance value (e.g., 0) to the pixel when the luminance value is not greater than the threshold value. Thus, as the computational complexity may be significantly reduced by image binarization and down-sampling, the optical mouse function can be easily realized through analyzing successive down-sampled binary images by using simplified algorithm/low-power algorithm.

Additionally, due to using simplified algorithm/low-power algorithm in the second operation mode, power consumption of the image signal processing block 108 in the second operation mode is lower than power consumption of the image signal processing block 108 in the first operation mode. In a case where the electronic device 100 is a portable electronic device powered by a battery device, the electronic device 100 may benefit from such a low power consumption feature of the multi-purpose camera system 102 when the multi-purpose camera system 102 is configured to act as part of an optical mouse which is required to continuously capture successive images for detecting movement/action of an object such as user's finger.

In a third exemplary design, at least one control module included in the control circuit 116 employs a first algorithm in the first operation mode, and employs a second algorithm different from the first algorithm in the second operation mode. As the multi-purpose camera system 102 operated in the second operation mode to perform an optical mouse function does not need to produce a precise image of a captured scene, one or more of the control modules included in the control circuit 116 may employ the second algorithm (e.g., a simplified algorithm or a low-power algorithm) without affecting the desired optical mouse function. More specifically, the object (e.g., user's finger) to be detected in the second operation mode is generally placed just in front of the camera lens of the optical system 112. Hence, images which can be used to successfully detect the movement/action of the object (e.g., user's finger) may be obtained by setting the exposure control module 204 to use a pre-defined and fixed exposure parameter setting instead of a normal auto-exposure function, and/or setting the focus control module 202 to use a pre-defined and fixed focus parameter setting instead of a normal auto-focus function. Additionally, due to using simplified algorithm/low-power algorithm in the second operation mode, power consumption of the control circuit 116 in the second operation mode is lower than power consumption of the control circuit 116 in the first operation mode. In a case where the electronic device 100 is a portable electronic device powered by a battery device, the electronic device 100 may benefit from such a low power consumption feature of the multi-purpose camera system 102 when the multi-purpose camera system 102 is configured to act as part of an optical mouse which is required to continuously capture successive images for detecting movement/action of an object such as user's finger.

In a fourth exemplary design, the image capture block 106 is configured to operate in a first capture frame rate in the first operation mode, and is configured to operate in a second capture frame rate higher than the first capture frame rate in the second operation mode. For example, the first capture frame rate is set by a normal frame rate of a camera, and the second capture frame rate is set by a highest frame rate supported by the multi-purpose camera system 102. With an increased capture frame rate employed by the multi-purpose camera system 102 in the second operation mode, the sensitivity of the optical mouse function is improved accordingly.

In a fifth exemplary design, the image capture block 106 is configured to operate in a first capture resolution in the first operation mode, and is configured to operate in a second capture resolution lower than the first capture resolution in the second operation mode. As the multi-purpose camera system 102 operated in the second operation mode to perform an optical mouse function does not need to produce a precise image of a captured scene, the capture resolution may be reduced in the second operation mode to reduce the computational complexity as well as power consumption. Similarly, in a case where the electronic device 100 is a portable electronic device powered by a battery device, the electronic device 100 may benefit from such a low power consumption feature of the multi-purpose camera system 102 when the multi-purpose camera system 102 is configured to act as part of an optical mouse which is required to continuously capture successive images for detecting movement/action of an object such as user's finger.

Figure 3:
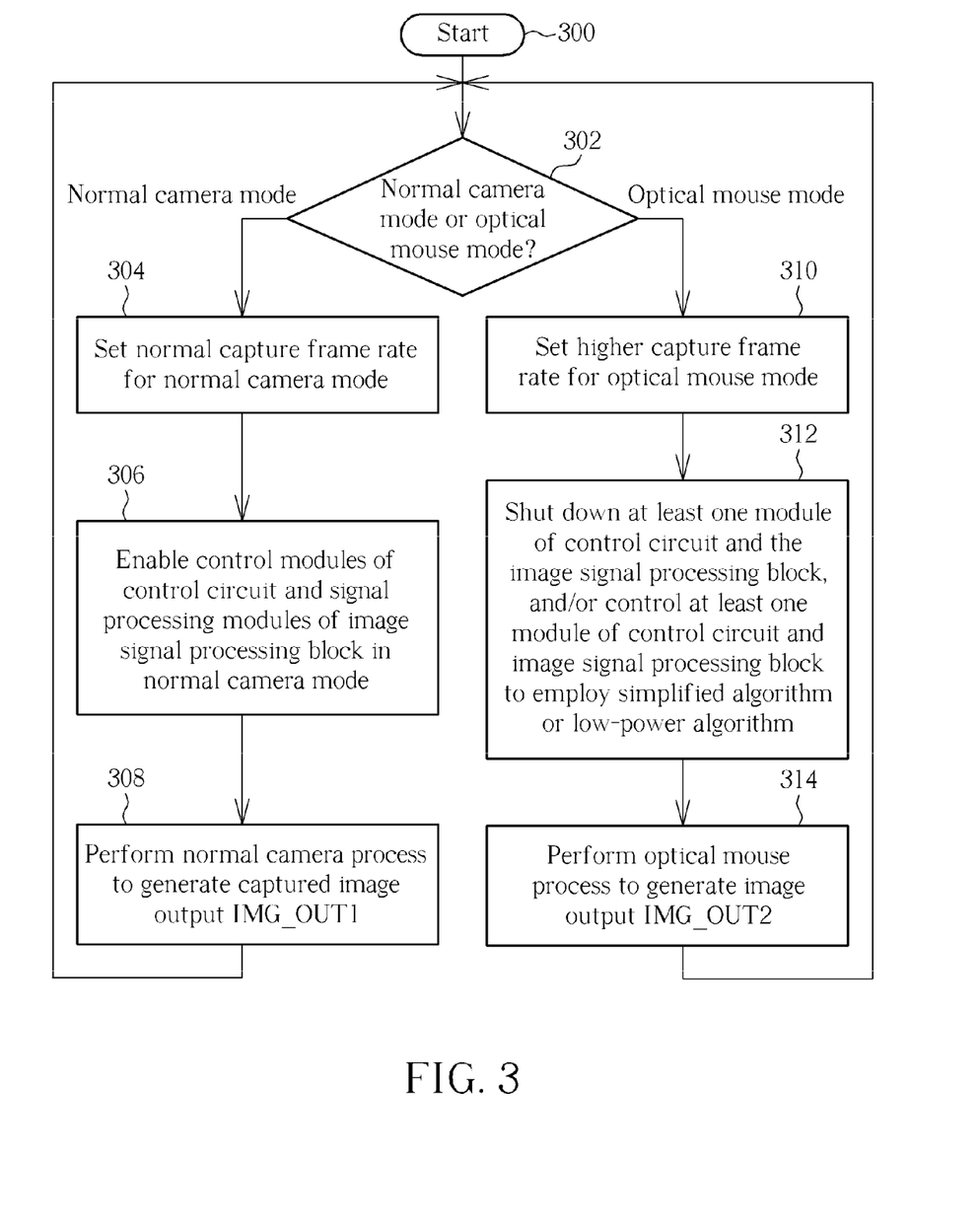
FIG. 3 is a flowchart illustrating a mode switching operation of the multi-purpose camera system according to an exemplary embodiment.

As mentioned above, the multi-purpose camera system 102 supports different operation modes, including the first operation mode (e.g., normal camera mode) and the second operation mode (e.g., optical mouse mode). The multi-purpose camera system 102 may switch between different operation modes in response to a mode control signal triggered by the user or application software. FIG. 3 is a flowchart illustrating a mode switching operation of the multi-purpose camera system 102 according to an exemplary embodiment. Provided that the result is substantially the same, the steps are not required to be executed in the exact order shown in FIG. 3. The exemplary mode switching operation may be briefly summarized as follows.

Step 300: Start.

Step 302: Check which operation mode that the multi-purpose camera system 102 should enter. If the multi-purpose camera system 102 is required to enter the first operation mode (e.g., normal camera mode), the flow proceeds with step 304. If the multi-purpose camera system 102 is required to enter the second operation mode (e.g., optical mouse mode), the flow proceeds with step 310.

Step 304: Set the normal capture frame rate for the normal camera mode.

Step 306: Enable control modules of the control circuit 116 and signal processing modules of the image signal processing block 108 in the normal camera mode.

Step 308: Perform the normal camera process to generate the captured image output IMG_OUT1. Next, the flow proceeds with step 302 to check if the current operation mode should be changed.

Step 310: Set the higher capture frame rate for the optical mouse mode.

Step 312: Shut down at least one module of the control circuit 116 and the image signal processing block 108, and/or control at least one module of the control circuit 116 and the image signal processing block 108 to employ a simplified algorithm or a low-power algorithm.

Step 314: Perform the optical mouse process to generate the image output IMG_OUT2. Next, the flow proceeds with step 302 to check if the current operation mode should be changed.

As a person skilled in the art can readily understand details of each step in FIG. 3 after reading above paragraphs, further description is omitted here for brevity.

After the image output IMG_OUT2 is generated from the multi-purpose camera system 102, the image output IMG_OUT2 may be further processed to identify the user input, such as movement/action of user's finger. For example, the user input processing system 104 shown in FIG. 1 may identify the user input as one of a plurality of predetermined mouse operations, including a single click action, a double click action, a fast/slow cursor move action, etc. When an image frame of the image output IMG_OUT2 indicates that there is no object (e.g., user's finger) present, an "All White" status is detected by the user input processing system 104. When an image of the image output IMG_OUT2 indicates that there is an object (e.g., user's finger) present and the covered image area percentage of the object (e.g., user's finger) in the checked image frame exceeds a threshold value, an "All Black" status is detected by the user input processing system 104. Hence, in a case where the user input processing system 104 sequentially detects "All White" status, "All Black" status and "All White" status when processing three consecutive image frames of the image output IMG_OUT2, the user input processing system 104 therefore identifies the user input as a single click action. In another case where the user input processing system 104 sequentially detects "All White" status, "All Black" status, "All White" status and "All Black" status when processing four consecutive image frames of the image output IMG_OUT2, the user input processing system 104 therefore identifies the user input as a double click action.

Besides, the user input processing system 104 may obtain coordinate information of the object (e.g., user's finger) by processing image frames of the image output IMG_OUT2. For example, the user input processing system 104 may perform the global motion estimation operation upon the image frames of the image output IMG_OUT2 to identify coordinates of the object (e.g., user's finger) found in the image frames. Please refer to FIG. 4, which is a diagram illustrating an exemplary implementation of the user input processing system 104 shown in FIG. 1. The user input processing system 104 includes a global motion estimation block 402 and a processor 404. The global motion estimation block 402 is arranged for generating global motion information INF according to the image output IMG_OUT2 of the image signal processing block 108. The processor 404 is arranged for identifying the user input according to the global motion information INF. When none of the aforementioned "All White" state and "All Black" status can be detected in the consecutive image frames each having the covered image area percentage of the object (e.g., user's finger) not exceeding the threshold value, the processor 404 may calculate the coordinate change rate of consecutive image frames of the image output IMG_OUT2 to determine if the user input is a fast cursor move action or a slow cursor move action.

Figure 4:
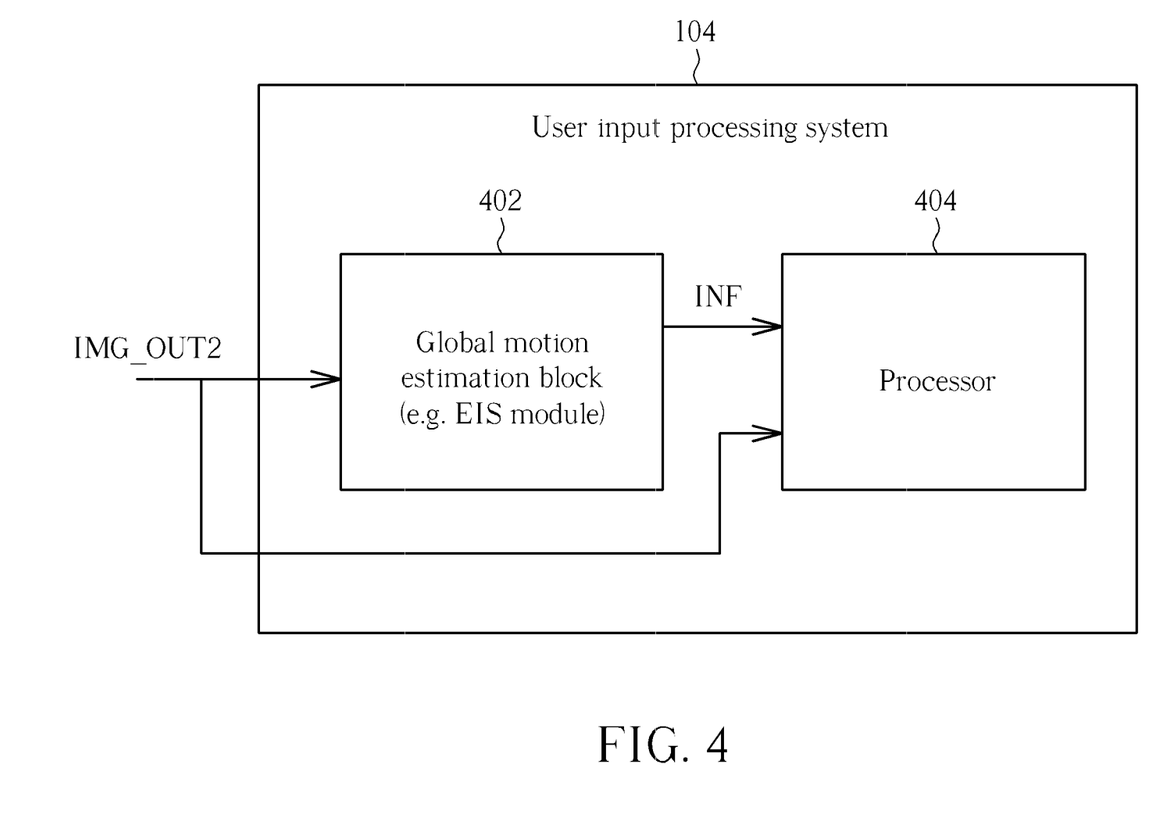
FIG. 4 is a diagram illustrating an exemplary implementation of the user input processing system shown in FIG. 1.

The global motion estimation block 402 may be a functional block dedicated to processing the image output IMG_OUT2 generated in the second operation mode. However, this is for illustrative purposes only, and is not meant to be a limitation of the present invention. Alternatively, if the camera system is equipped with an electronic image stabilization (EIS) module, the EIS module may also be used as the global motion estimation block 402 due to the fact that the EIS module is capable of performing the desired global motion estimation. That is, the EIS module performs its designated EIS function when the multi-purpose camera system 102 is operated in the first operation mode (e.g., normal camera mode), and acts as the global motion estimation block 402 when the multi-purpose camera system 102 is operated in the second operation mode (e.g., optical mouse mode).

Similarly, the processor 404 may be a functional block dedicated to processing the global motion information INF derived from the image output IMG_OUT2 to identify the user input as a fast cursor move action or a slow cursor move action, or processing image frames of the image output IMG_OUT2 to identify the user input as a single click action or a double click action. However, this is for illustrative purposes only, and is not meant to be a limitation of the present invention. In an alternative design, a central processing unit (CPU) of the electronic device 100 may also be used to act as the processor 404.

Figure 5:
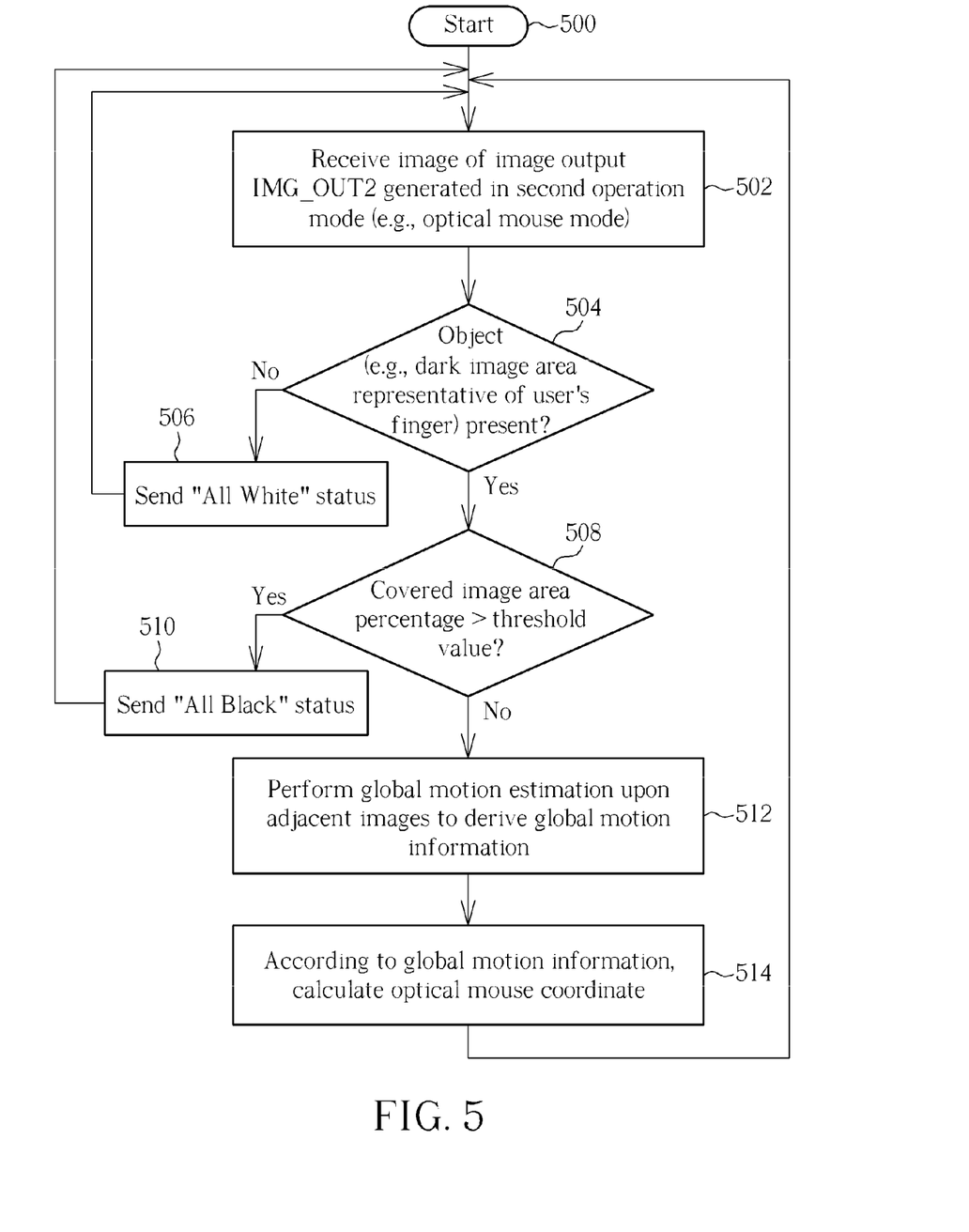
FIG. 5 is a flowchart illustrating an exemplary user input identification operation performed by the user input processing system to identify the user input as one optical mouse operation.

FIG. 5 is a flowchart illustrating an exemplary user input identification operation performed by the user input processing system 104 to identify the user input as one optical mouse operation. Provided that the result is substantially the same, the steps are not required to be executed in the exact order shown in FIG. 5. The exemplary user input identification operation may be briefly summarized as follows.

Step 500: Start.

Step 502: Receive an image of the image output IMG_OUT2 generated from the image signal processing block 108 in the second operation mode.

Step 504: Check if the received image frame of the image output IMG_OUT2 has an object (e.g., a dark image area representative of user's finger) present. If yes, go to step 508; otherwise, go to step 506:

Step 506: Send an "All White" status. Next, the flow proceeds with step 502 to receive the next image of the image output IMG_OUT2.

Step 508: Check if the covered image area percentage of the object exceeds a threshold value. If yes, go to step 510; otherwise, go to step 512.

Step 510: Send an "All Black" status. Next, the flow proceeds with step 502 to receive the next image of the image output IMG_OUT2.

Step 512: Perform global motion estimation upon adjacent images to derive the global motion information INF.

Step 514: According to the global motion information INF, calculate the optical mouse coordinate. Next, the flow proceeds with step 502 to receive the next image of the image output IMG_OUT2.

Based on the status transition pattern (e.g., a sequence of "All White", "All Black" and "All White", or a sequence of "All White", "All Black", "All White" and "All Black") or the optical mouse coordinates, the processor 404 is capable of identifying the user input as one optical mouse operation. As a person skilled in the art can readily understand details of each step in FIG. 5 after reading above paragraphs, further description is omitted here for brevity.

Please note that proposed multi-purpose camera system 102 of the present invention is not limited to the optical mouse application. In one alternative design, the user input processing system 104 shown in FIG. 1 may identify the user input as one of a plurality of predetermined directional key operations, including an up key pressing action, a down key pressing action, a left key pressing action, and a right key pressing action. For example, the processor 404 may compare coordinates of the object (e.g., user's finger) in different image frames to determine which directional key operation is entered by the user. In another alternative design, the user input processing system 104 shown in FIG. 1 may identify the user input as one of a plurality of predetermined touch panel operations. To put it simply, the user input apparatus composed of the multi-purpose camera system 102 and the user input processing system 104 operated in the second operation mode may act as an optical mouse, directional keys/directional pad or a touch panel, depending upon actual design requirement/consideration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-purpose camera system, comprising:
an image capture block, arranged for generating an image signal, wherein the image capture block comprises an image sensor, an optical system, and a control circuit; and
an image signal processing block, arranged for processing the image signal;
wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; an overall configuration of the control circuit and the image signal processing block in the first operation mode is different from an overall configuration of the control circuit and the image signal processing block in the second operation mode; and at least one of the image signal processing block and the control circuit has lower power consumption in the second operation mode than in the first operation mode.

2. The multi-purpose camera system of claim 1, wherein power consumption of the image signal processing block in the second operation mode is lower than power consumption of the image signal processing block in the first operation mode.

3. The multi-purpose camera system of claim 1, wherein one signal processing module included in the image signal processing block is enabled in the first operation mode, and is disabled in the second operation mode.

4. The multi-purpose camera system of claim 1, wherein one signal processing module included in the image signal processing block employs a first algorithm in the first operation mode, and employs a second algorithm different from the first algorithm in the second operation mode.

5. The multi-purpose camera system of claim 1, wherein power consumption of the control circuit in the second operation mode is lower than power consumption of the control circuit in the first operation mode.

6. The multi-purpose camera system of claim 1, wherein one control module included in the control circuit employs a first algorithm in the first operation mode, and employs a second algorithm different from the first algorithm in the second operation mode.

7. The multi-purpose camera system of claim 1, wherein when the multi-purpose camera system acts as part of the user input apparatus, the control circuit employs a pre-defined and fixed focus parameter setting.

8. The multi-purpose camera system of claim 1, wherein when the multi-purpose camera system acts as part of the user input apparatus, the control circuit employs a pre-defined and fixed exposure parameter setting.

9. The multi-purpose camera system of claim 1, wherein the image signal processing block converts a color image into a black & white image in the second operation mode.

10. The multi-purpose camera system of claim 9, wherein the image signal processing block performs an RGB-to-YUV color transform upon the color image, and only stores luminance values derived from the RGB-to-YUV color transform.

11. A multi-purpose camera system, comprising:
an image capture block, arranged for generating an image signal, wherein the image capture block comprises an image sensor, an optical system, and a control circuit; and
an image signal processing block, arranged for processing the image signal;
wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; an overall configuration of the control circuit and the image signal processing block in the first operation mode is different from an overall configuration of the control circuit and the image signal processing block in the second operation mode; the image signal processing block converts a color image into a black & white image in the second operation mode; the image signal processing block further compares a luminance value of a pixel in the black & white image with a threshold value; when the luminance value is greater than the threshold value, the image signal processing block assigns a first predetermined luminance value to the pixel; and when the luminance value is not greater than the threshold value, the image signal processing block assigns a second predetermined luminance value to the pixel.

12. A multi-purpose camera system, comprising:
an image capture block, arranged for generating an image signal, wherein the image capture block comprises an image sensor, an optical system, and a control circuit; and
an image signal processing block, arranged for processing the image signal;
wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; and an overall configuration of the control circuit and the image signal processing block in the first operation mode is different from an overall configuration of the control circuit and the image signal processing block in the second operation mode; the image signal processing block converts a color image into a black & white image in the second operation mode; the image signal processing block further down-samples black & white image to generate a down-sampled black & white image, and compares a luminance value of a pixel in the down-sampled black & white image with a threshold value; when the luminance value is greater than the threshold value, the image signal processing block assigns a first predetermined luminance value to the pixel; and when the luminance value is not greater than the threshold value, the image signal processing block assigns a second predetermined luminance value to the pixel.

13. The multi-purpose camera system of claim 1, wherein a white balance module included in the image signal processing block is enabled in the first operation mode, and is disabled in the second operation mode.

14. The multi-purpose camera system of claim 1, wherein the image capture block operates at a first capture frame rate in the first operation mode, and operates at a second capture frame rate higher than the first capture frame rate in the second operation mode.

15. The multi-purpose camera system of claim 1, wherein the image capture block operates at a first capture resolution in the first operation mode, and operates at a second capture resolution lower than the first capture resolution in the second operation mode.

16. An electronic device, comprising:
a multi-purpose camera system, comprising:
an image capture block, arranged for generating an image signal, wherein the image capture block comprises an image sensor, an optical system, and a control circuit; and
an image signal processing block, arranged for processing the image signal, wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; an overall configuration of the control circuit and the image signal processing block in the first operation mode is different from an overall configuration of the control circuit and the image signal processing block in the second operation mode; and at least one of the image signal processing block and the control circuit has lower power consumption in the second operation mode than in the first operation mode; and
a user input processing system, acting as another part of the user input apparatus and arranged for identifying the user input by processing an image output of the image signal processing block in the second operation mode.

17. The electronic device of claim 16, wherein the user input processing system comprises:
a global motion estimation block, arranged for generating global motion information according to the image output of the image signal processing block; and
a processor, arranged for identifying the user input according to the global motion information.

18. The electronic device of claim 17, wherein the global motion estimation block is an electronic image stabilization (EIS) module.

19. The electronic device of claim 16, wherein the user input processing system identifies the user input as one of a plurality of predetermined mouse operations.

20. The electronic device of claim 16, wherein the user input processing system identifies the user input as one of a plurality of predetermined directional key operations.

21. The electronic device of claim 16, wherein the user input processing system identifies the user input as one of a plurality of predetermined touch panel operations.

22. The electronic device of claim 16, being a portable electronic device.

23. The electronic device of claim 22, wherein the portable electronic device is a mobile phone.

24. A multi-purpose camera system integrated in a portable electronic device, comprising:
an image capture block, arranged for generating an image signal; and
an image signal processing block, arranged for processing the image signal;
wherein when the multi-purpose camera system is operated in a first operation mode, the multi-purpose camera system acts as a camera for generating a captured image output; when the multi-purpose camera system is operated in a second operation mode, the multi-purpose camera system acts as part of a user input apparatus for receiving a user input; and a control circuit included in the image capture block has lower power consumption in the second operation mode than in the first operation mode.

25. The multi-purpose camera system of claim 24, wherein the portable electronic device is a mobile phone.

* * * * *